United States Patent [19]

Nadherny et al.

[11] 4,360,300

[45] Nov. 23, 1982

[54] SELF-RESETTING SNUBBING ANCHORING AND RELEASING LADING STRAPPING ON RAILWAY FREIGHT CARS

[75] Inventors: Rudolph E. Nadherny, Naperville, Ill.; Theodore J. Sweger, Lake Worth, Fla.

[73] Assignee: Illinois Railway Equipment Company, Chicago, Ill.

[21] Appl. No.: 294,734

[22] Filed: Aug. 20, 1981

Related U.S. Application Data

[63] Continuation-in-part of Ser. No. 189,002, Sep. 22, 1980.

[51] Int. Cl.³ .............................. B60P 7/10; B60P 7/16; B61D 3/16; B61D 45/00
[52] U.S. Cl. ........................................ 410/34; 410/38; 410/100; 410/103
[58] Field of Search ..................... 410/32, 34, 38, 40, 410/100, 103

[56] References Cited

U.S. PATENT DOCUMENTS

| | | | |
|---|---|---|---|
| 804,863 | 11/1905 | Kempton | 410/34 |
| 2,628,397 | 2/1953 | Olson | 410/103 |
| 3,804,028 | 4/1974 | O'Leary et al. | 410/40 |
| 3,942,454 | 3/1976 | Broling | 410/100 |
| 4,247,235 | 1/1981 | Sunesson | 410/100 X |
| 4,314,783 | 2/1982 | Parnell et al. | 410/34 |

Primary Examiner—Robert B. Reeves
Assistant Examiner—Howard Beltran
Attorney, Agent, or Firm—Lockwood, Dewey, Alex & Cummings

[57] ABSTRACT

Cargo carried on freight cars such as flat bed railway cars is secured in place by lading strapping that is tensioned around the cargo so as to compress a snubber unit on a self-resetting lading tie anchor and snubbing device that includes a snubber mechanism and a lading tie anchor assembly slidably mounted in a housing secured directly to the side sill of the freight car, which anchor assembly is locked in an automatically retracted position to automatically reset the device when it drops into the housing due to the force of gravity to bring a latch into operative interengagement with the snubbing device. At this position, lading strapping is passed through a lading tie anchor that moves generally upwardly as tension is applied to the lading strapping in opposition to bias provided by the snubber mechanism. The mechanism is unlocked by driving down on the latch to take it out of engagement with the snubbing device and to quickly release the device to substantially reduce tension within the lading strapping before it is removed from the cargo.

16 Claims, 8 Drawing Figures

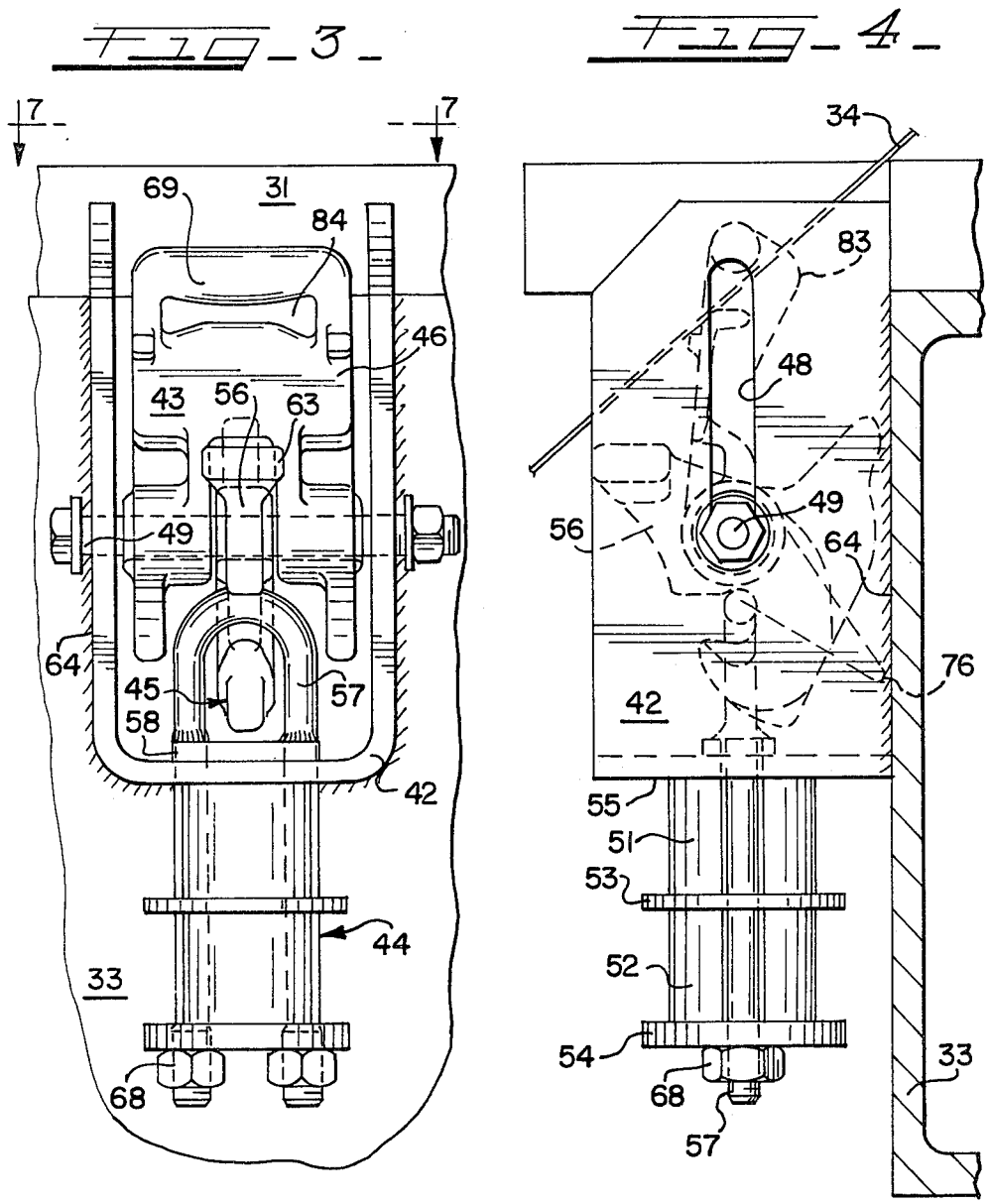

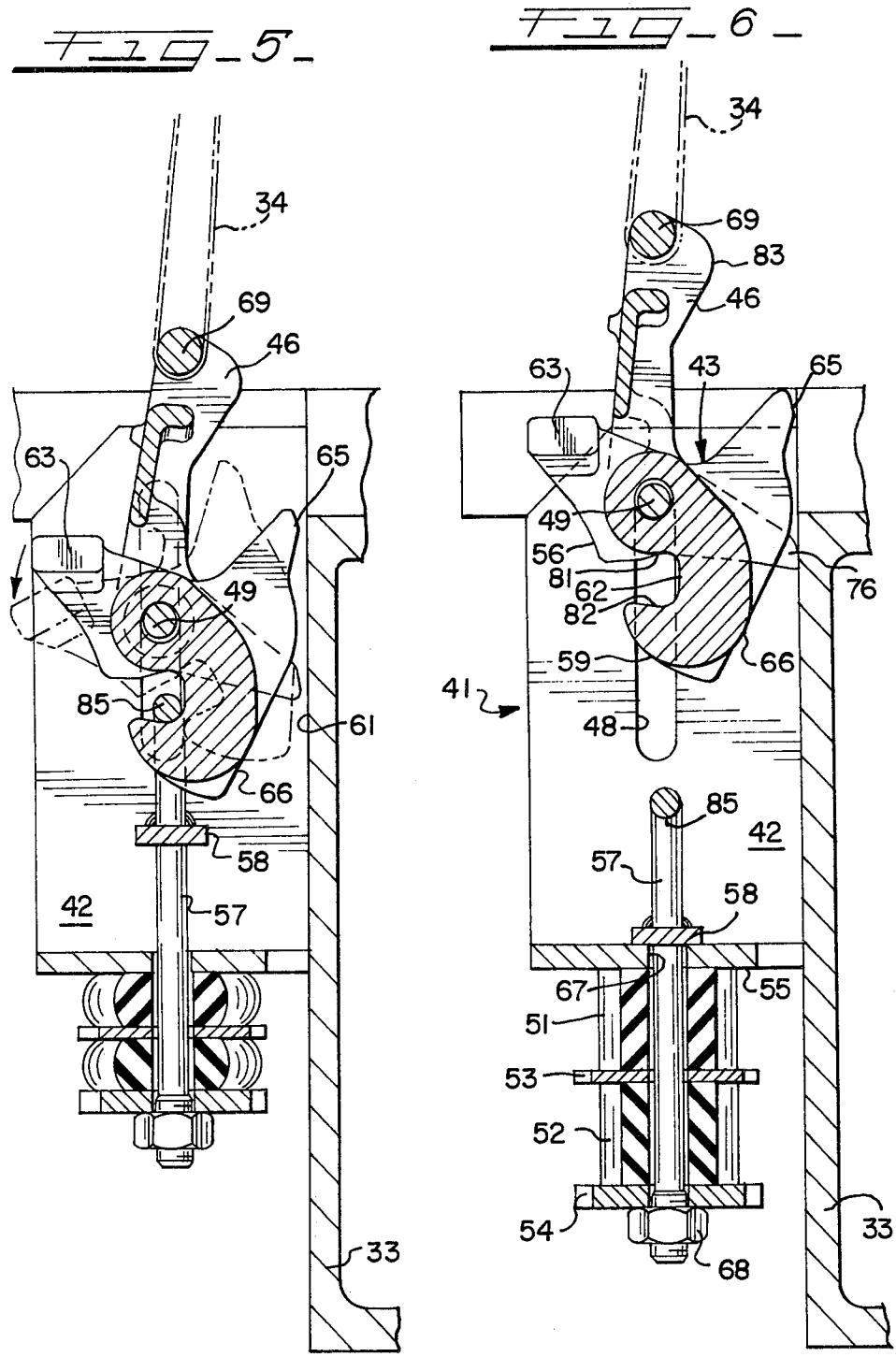

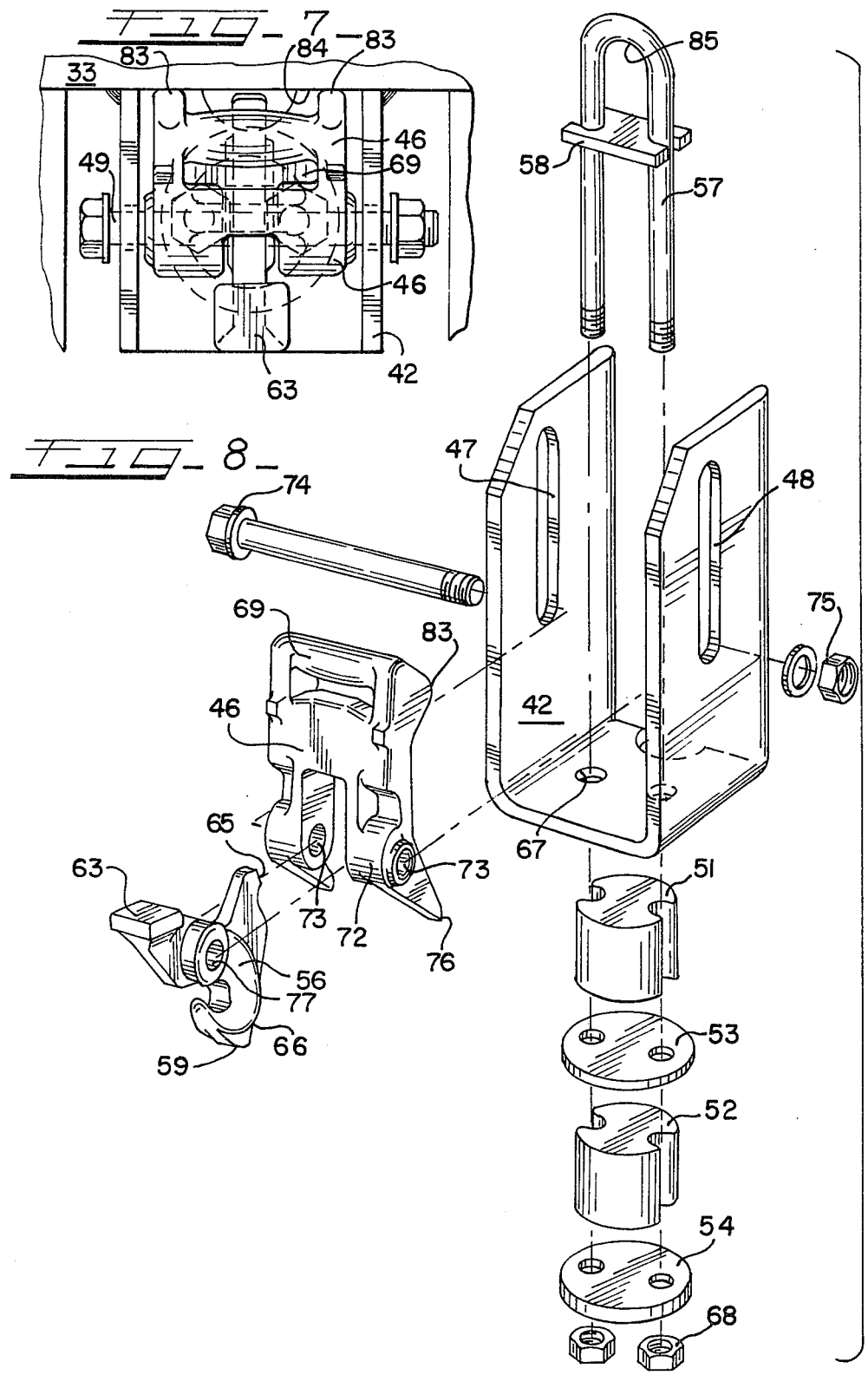

SELF-RESETTING SNUBBING ANCHORING AND RELEASING LADING STRAPPING ON RAILWAY FREIGHT CARS

BACKGROUND AND DESCRIPTION OF THE INVENTION

This application is a continuation-in-part to application Ser. No. 189,002, filed Sept. 22, 1980.

This invention generally relates to mechanisms for the quick release of tension in lading strapping that is secured about cargo, more particularly to a self-resetting, generally vertically operable quick-release mechanism having a housing directly secured to a railway freight car within which is generally vertically movable an anchor assembly having a lading tie anchor to which the lading strapping is attached, the anchor assembly being automatically locked within the housing by the operation of gravity to maintain tension in the lading strapping by a snubber mechanism during transport of the cargo and being unlockable by application of a downwardly directed force to quickly relieve the tension prior to removal of the lading strapping.

Various commodities are shipped in open freight carrying cars, requiring that such cargo be tied down for safe transport over long distances and rough terrain or tracks, such commodities including, for example, logs, lumber, plaster board, and large bulky items such as machinery. In some instances, the lading straps, which typically are steel bands, are secured to bolts, U-brackets, hooks, or the like that are simply welded to the railway car, and the strapping is typically removed by severing or otherwise unfastening the strapping which then has a tendency to spring around the cargo and fly up, posing a possible danger to workmen and/or the cargo.

Often, such lading strapping systems incorporate snubbing devices to develop and maintain tension within the lading strapping while the cargo is being transported, but at times these devices are not structured so as to be easily and quickly releasable, with the result that workers typically sever the lading straps while they are still under substantial tension around the cargo, whereupon they will usually spring up and fly about.

In an effort to enhance the ease of operation and improve the safety of these types of devices, quick-release mechanisms have been provided whereby the tension under which the lading straps are compressed can be substantially eliminated before the strapping is removed or severed. The types of quick-release mechanisms that are heretofore known are typically of a type which are mounted such that one end thereof is generally even with the deck level, often within troughs at the edge of the deck, and such that the bulk of the device projects above deck level when it is under tension from the strapping. Usually such devices will be designed such that, when they are not in use for tensioning the strapping around cargo during transport thereof, they are supposed to lie within the trough for storage. It sometimes happens, however, that such devices are not properly laid within their respective troughs, but lie at least in part on the floor or bed of the freight car, at which position they can be readily damaged by lift trucks while the cargo is being unloaded from the freight car, or they can pose an obstacle for workers on the freight car. Even when such devices are properly stored in their troughs when not in use, they are subject to being damaged by rattling about within the troughs or to bouncing out of the troughs as the car is transported over rough terrain or track while they are not under tension from cargo strapping.

Additionally, quick-release mechanisms of this general type are somewhat labor intensive in that a workman must manually reset each device whereby it can be made operable by locking the snubber unit into place before applying the lading strapping and tensioning the strapping around the cargo.

By the present invention, these various difficulties and problems are substantially removed by providing a self-resetting type of quick-release mechanism that is rigidly mounted directly to the side of the freight trailer or car, the device having a structure such that tension that is developed within lading strapping secured over cargo in opposition to a snubber assembly is quickly and readily released by applying a generally downwardly directed force to unlock the device, after which the strapping can be safely removed or severed, at which time the quick-release mechanism automatically falls down by gravity to be reset to a locked condition that is free and clear of the trailer or car deck, the device thus being locked or reset for subsequent application of strapping tension or for transport of the freight car over rough terrain when it is not in use to anchor lading strapping over cargo, whereby the device remains safely tucked away to avoid interference with lift trucks or workmen.

It is accordingly a general object of this invention to provide an improved quick-release device for anchoring lading strapping.

Another object of the present invention is an improved lading strapping quick-release device which is self-resetting or automatically locking.

Another object of the present invention is an improved quick-release mechanism for tensioning lading strapping which includes a locking assembly to lessen workman labor by being automatically reset when its snubber mechanism drops in the housing by the force of gravity.

Another object of this invention is an improved quick-release device for anchoring lading strapping having a self-reset condition at a location generally flush with the floor of the trailer or car.

Another object of the present invention is an improved quick-release for anchoring lading strapping, which device is unlocked by application of a generally downwardly directed force thereto.

These and other objects of the present invention will be apparent from the following detailed description of the preferred embodiment thereof, taken in conjunction with the accompanying drawings, wherein:

FIG. 3 is a front elevational view generally along line 3—3 of FIG. 1, illustrating the preferred embodiment of this invention in its locked and relaxed position;

FIG. 4 is a side elevational view of the locked and relaxed device illustrated in FIG. 3;

FIG. 5 is a side sectional view of the preferred device shown in its locked position and tensioned condition, illustrating its unlocking motion in phantom;

FIG. 6 is a side sectional view of the preferred device in its unlocked and relaxed condition after quick release and prior to removal of the lading strap;

FIG. 7 is a top plan view generally along the line 7—7 of FIG. 3; and

FIG. 8 is an exploded, perspective view of the device of FIG. 4.

The device is automatically locked by generally vertical dropping movement of a lading tie anchor assembly, and a lading strap is placed over a cargo and is fastened to a lading tie anchor of the anchor assembly. Then, the lading strap is put under tension while a snubber assembly is compressed in opposition to the strap tensioning forces, at which time the cargo is ready for shipment. Upon reaching the desired destination, the device is unlocked by applying a generally downward force onto a locking assembly, thereby releasing the tension within the snubber assembly and permitting upward movement of the lading tie anchor in order to relax the tension within the strapping so that it may be readily and safely removed to permit unloading of the cargo.

Figure 1:
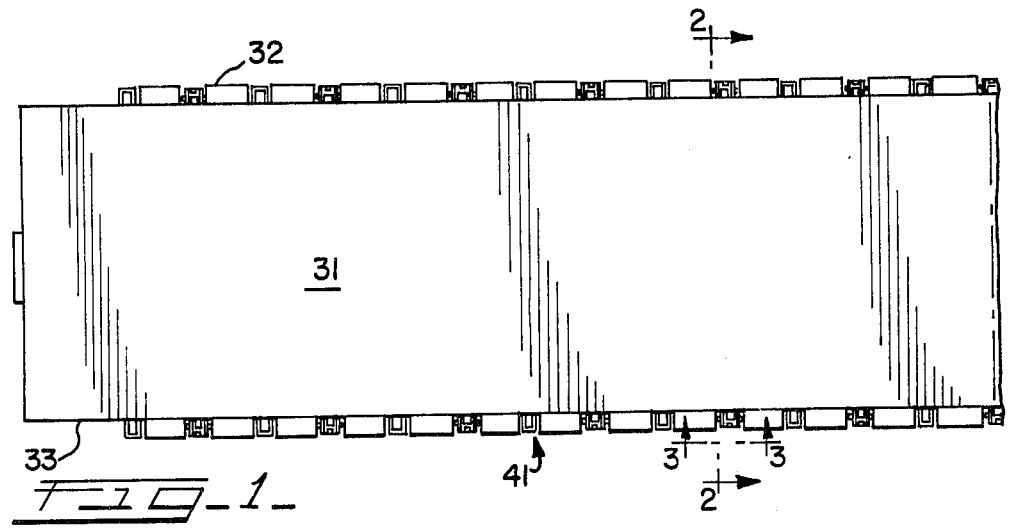
FIG. 1 is a plan view of a portion of a flat bed car having a plurality of self-resetting quick-release mechanisms according to this invention.
Figure 2:
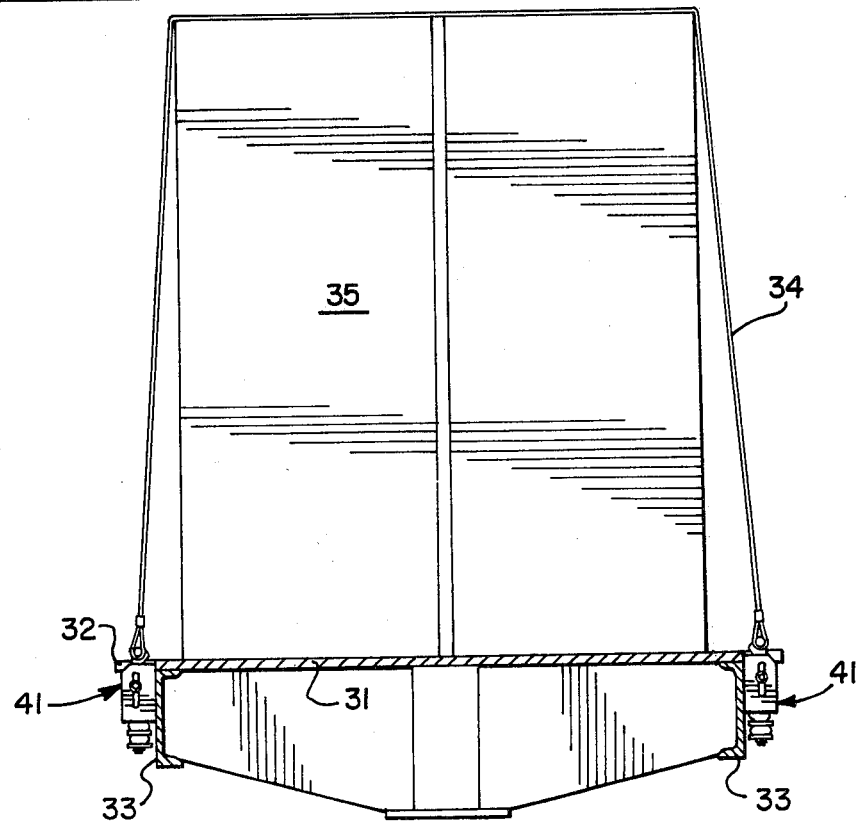
FIG. 2 is a sectional view generally through line 2—2 of FIG. 1.

A flat car bed 31, illustrated in FIGS. 1 and 2, includes a plurality of storage troughs 32 that are sometimes included on railway flat cars for storage of conventional quick-release mechanisms. The self-resetting devices according to this invention, which are designated generally at 41, can be securely fastened directly to a side sill 33 of the car, there being no need to include the storage troughs 32. A length of lading strapping 34 is shown tensioned over cargo 35, which is ready for transport.

Device 41, which is more fully illustrated in FIGS. 3 through 8, includes a housing, generally designated 42, an anchor assembly, generally designated 43, a snubber assembly generally indicated at 44, and a locking assembly generally designated as 45, the anchor assembly 43 being generally vertically movable within the housing 42 between an automatically retracted, locked position thereof and a generally extended, unlocked position. The anchor assembly 43 includes a lading tie anchor 46 for receiving the lading strapping 34. The locking assembly 45 is structured to automatically engage the anchor assembly 43 when the anchor assembly 43 is permitted to fall by gravity generally within the housing 42, locking assembly 45 permitting generally downward forces applied thereto to release the anchor assembly 43 to a generally extended, unlocked position. Constraint assembly, including elongated slots 47, 48 and a retaining pin 49 of the anchor assembly 43, retain the anchor assembly 43 within the housing 42 and restrict the extent of its movement.

FIGS. 3, 4 and 7 particularly illustrate the device 41 in its locked position, with the snubber assembly 44 being in a relaxed condition whereby elastomeric inserts 51 and 52 are not compressed between thrust plates 53, 54 and an underside surface 55 of the housing 42. In this locked position, a latch 56 of the locking assembly 45 operatively engages a receiving member or elongated mounting member 57 of the snubber assembly 44 such as a U-bolt shown, an I-bolt, or the like. The elongated mounting member 57 is preferably held in place and excessive downward movement thereof is prevented by a plate 58 rigidly secured to the elongated mounting member.

The automatic locking feature is perhaps best illustrated in FIGS. 4, 5 and 6. With the device 41 in the unlocked and relaxed condition shown in FIG. 6, the anchor assembly 43 falls by gravity within the housing 42 when the lading strapping 34 is removed, at which time a deflection ledge 59 on the bottom of the latch 56 momentarily engages the top surface of an eye 85 of the elongated mounting member 57 to deflect the latch 56 generally toward the side sill 33, or to the right or in counterclockwise rotation about the retaining pin 49 as illustrated in phantom in FIG. 5. Excessive movement of the latch 56 both away from and toward the side sill 33 is prevented by having a top rear surface 65 and a bottom rear surface 66 of the latch 56 butt against a stop surface 61 of the side sill 33.

The latch 56 has a hooking indent 62 that has an upper stop portion 81 and a lower gripping portion 82. After the latch 56 is deflected or kicked by the elongated mounting member 57, the hooking indent 62 rotates away from the side sill 33 and falls generally downwardly until the stop portion 81 of the hooking indent 62 rests on the elongated mounting member 57, as illustrated in FIG. 4. This is the at-rest position of the device 41, and the security of this position can be enhanced by providing the upper stop portion 81 as an indented portion. The stored-away position of the device 41 is illustrated in FIG. 7, which is substantially the same as FIG. 4, except a boss 83 of the lading tie anchor 46 rests on a vertical wall 84 of the side sill 33 as shown in FIG. 7. The boss may instead rest on a vertical back wall of the housing, when the housing has a back wall (not shown).

With the device 41 in the locked and automatically retracted condition and with the snubber assembly 44 relaxed as illustrated in FIGS. 3, 4 and 6, the device 41 is ready for removal of the cargo 35 from the flat car bed 31 by workmen and/or fork-lift trucks and for subsequent transport of the freight car across rough terrain or tracks with the device 41 being retracted and tucked safely out of the way. At this position, the device 41 is also automatically ready for affixing the lading strapping 34 to the lading tie anchor 46 (FIG. 4) and then tensioning the lading strapping 34 by conventional means so as to engage the lower gripping portion of the hooking indent 62 with the eye 85 of the elongated mounting member 57 to compress the elastomeric inserts 51, 52 of the snubber assembly 44 to the condition illustrated in FIG. 5 in order to securely fasten the cargo 34 to the flat car bed 31. Excessive outward movement of the lading tie anchor 46 is prevented by engagement of an extension 76 of the anchor 46 with the side sill 33.

When it is desired to remove the cargo 35, the latch 46 is deflected generally downwardly by a workman using a pry bar, sledge, hook, or the like (not shown) to engage and move a latch surface 63 in order to rotate the latch 56 about the rotating pin 49 in the counterclockwise direction as illustrated by the arrow in FIG. 5, whereby the hooking indent 62 moves generally toward the side sill 33 until the hooking indent 62 clears the eye 85 of the elongated mounting member 57, at which time the anchor assembly 43 is raised generally upwardly by the tension within the lading strapping 34, such upward movement being stopped, if necessary, by the upper end of the elongated slots 47 and 48, at which position the tension within the lading strapping 34 is substantially relieved.

The device 41 basically provides a variety of heights of head 69 of the lading tie anchor 46 between the stored-away position shown in FIGS. 3 and 7, the at-rest position shown in FIG. 4, the tensioned position shown in FIG. 5, and the released and extended position of FIG. 6.

Further details of the structure can be seen from FIG. 8, as can the ease with which the various parts of the device 41 may be repaired or replaced without having to break the rigid attachment, such as welds 64, of the housing 42 to the side sill 33. Housing 42 itself may be composed of two pieces (not shown). The snubber assembly 44 is assembled by passing the legs of the elongated mounting member 57 through aperture 67 within the bottom face of the housing 42 until the plate 58 abuts the inside bottom surface thereof, after which the elastomeric inserts 51, 52 and the thrust plates 53, 54 are slid over the legs and secured thereto by nuts 68 of the like. The anchor assembly 43 is assembled by passing the head 69 of the lading tie anchor 46 through an open panel or passageway 71 through the upper surface of the housing 42, after which the lading tie anchor 46 is located such that a clevis 72 thereon is in alignment with the slots 47 and 48 whereby the retaining pin 49 can be passed through the slit 47, through one clevis bore 73, through a transverse opening 77 of the latch 56, through another clevis bore 73, and through the slot 48, after which retainers 74, 75 such as washers and bolts are securely fastened to the retaining pin 49 in any conventional manner.

Typically, the snubber assembly 44 will provide a force of approximately three thousand pounds when the elastomeric inserts 51, 52 are compressed for maintaining tension in the lading strapping 34 for transport of the cargo 35. As an optional feature of this invention (not shown), application of the desired force can be indicated when a marked portion of the latch 56 or of the anchor assembly 43 is in general alignment with a marking on or a portion of the housing 42.

It will be apparent to those skilled in this art that the present invention can be embodied in various additional forms; accordingly, this invention is to be construed and limited only by the scope of the appended claims.

We claim:

1. Self-resetting lading tie anchor and snubbing device for releasably anchoring lading strapping to railway freight cars, comprising:
   a housing for securement to a railway freight car bed, said housing having a passageway through its upper end and an aperture through its lower end;
   a lading tie anchor assembly, at least a portion of which passes through said housing passageway, said lading tie anchor assembly being generally vertically movable between a generally retracted, locked position thereof and a generally extended, unlocked position thereof;
   snubber means affixed to said lading tie anchor assembly, said snubber means including an elastomeric insert and an elongated mounting member, said elongated mounting member being slidably mounted through said aperture of the lower end of the housing, and said elastomeric insert being mounted on said elongated mounting member;
   said lading tie anchor assembly transmitting tension within the lading strapping to said snubber means, and said snubber means maintaining tension in the lading strapping;
   vertical movement constraint means for preventing upward passage of said lading tie anchor assembly completely out of said housing;
   locking means for automatically setting said lading tie anchor assembly to said generally retracted, locked position and for releasing said lading tie anchor assembly to said generally extended, unlocked position to reduce the tension within the snubber means, said locking means including a surface for receiving generally downwardly directed forces for unlocking said device; and
   said locking means includes a rotatably mounted latch having a deflection ledge in momentary operative interengagement with an assembly of the device that drops into said housing by gravitational forces.

2. The self-resetting device of claim 1, wherein said snubber means further includes a thrust plate, and said lower end of the housing.

3. The self-resetting device of claim 1, wherein said locking means includes a rotatably mounted latch having a deflection ledge that rotates by deflecting operative interengagement with a portion of said lading tie anchor assembly when said assembly drops downwardly within said housing.

4. The self-resetting device of claim 1, wherein said locking means surface for receiving generally downwardly directed forces is on a rotatably mounted latch.

5. The self-resetting device of claim 1, wherein said housing is rigidly secured to a side sill of the freight car.

6. The self-resetting device of claim 1, wherein said lading tie anchor assembly includes a lading tie anchor head that projects generally above said housing.

7. The self-resetting device of claim 1, wherein said anchor assembly falls downwardly within said housing when said tension within said lading strapping is reduced.

8. The self-resetting device of claim 1, wherein said lading tie anchor assembly has a lading strap receiving head that has a maximum height approximately equal to that of the freight car bed when the device is retracted.

9. The self-resetting device of claim 1, further including surfaces on a rotatably mounted latch of said lock means to restrict rotation of said latch.

10. The self-resetting device of claim 1, wherein said constraint means includes an elongated slot in said housing and a projecting member of said anchor assembly that is slidably mounted within said slot.

11. The self-resetting device of claim 1, wherein said locking means includes a latch rotatable about a generally horizontal axis that operatively interengages an eye of the elongated mounting member.

12. The self-resetting device of claim 1, wherein said snubber means is mounted below said housing.

13. The self-resetting device of claim 1, wherein said locking means includes a latch rotatably mounted to said lading tie anchor assembly, said latch having a hooking indent for engaging said elongated mounting member, said hooking indent opening in a direction away from the railway freight car.

14. The combination of a railway freight car of the type having a deck and a side sill with a device for securing cargo thereonto by lengths of lading strapping anchored by a quick-release device having receiving means for holding the lading strapping over the cargo, the quick-release device being a self-resetting device comprising:
   a housing for securement to the side sill of the railway freight car, said housing having a passageway through its upper end and an aperture through its lower end;
   a lading tie anchor assembly, at least a portion of which passes through said housing passageway, said lading tie anchor assembly being generally vertically movable between a generally retracted, locked position thereof and a generally extended, unlocked position thereof, said generally retracted position being such that the device has a maximum height approximately equal to that of the side sill;

snubber means affixed to said lading tie anchor assembly, said snubber means including a resilient insert affixed to an elongated mounting member, said elongated mounting member being slidably mounted through said housing aperture, and said resilient insert being on said elongated mounting member;

said lading tie anchor assembly transmitting tension within the lading strapping to said snubber, and said snubber means maintaining tension in the lading strapping;

vertical movement constraint means for preventing upward passage of said lading tie anchor assembly completely out of said housing;

locking means for automatically setting said lading tie anchor assembly to said generally retracted, locked position and for releasing said lading tie anchor assembly to said generally extended, unlocked position to reduce the tension within the snubber means, said locking means including a surface for receiving generally downwardly directed forces for unlocking said device; and said locking means includes a rotatably mounted latch having a deflection ledge in momentary operative interengagement with an assembly of the device that drops into said housing by gravitational forces.

15. The combination of claim 14, wherein said lading tie anchor assembly includes a rotatably mounted lading tie anchor having a boss and an extension, said boss and extension being stops for engaging the side sill in order to restrict rotational movement of the lading tie anchor.

16. The combination of claim 14, wherein said locking means includes a rotatably mounted latch, said latch having a rear surface that restricts rotational movement of the latch.

* * * * *